ELECTRICAL APPARATUS

Filed May 7, 1956

3 Sheets-Sheet 1

INVENTORS.
Edward J. Mastney
BY & Ludwig J. Fichter.
Robert L. Kahn Atty.

May 13, 1958 E. J. MASTNEY ET AL 2,834,851

ELECTRICAL APPARATUS

Filed May 7, 1956 3 Sheets-Sheet 2

INVENTORS.
Edward J. Mastney &
Ludwig J. Fichter.
BY Robert L Kahn
Atty.

ELECTRICAL APPARATUS

Filed May 7, 1956

INVENTORS.
Edward J. Mastney
BY Ludwig J. Fichter
Robert L. Kahn Atty.

United States Patent Office 2,834,851

Patented May 13, 1958

2,834,851

ELECTRICAL APPARATUS

Edward J. Mastney, Berwyn, and Ludwig J. Fichter, Chicago, Ill., assignors to Oak Mfg. Co., a corporation of Illinois Application May 7, 1956, Serial No. 583,213

4 Claims. (Cl. 200—105)

This invention relates to an electrical apparatus and more particularly to a remote control stepping system for use in indexing devices like switches, switch type tuners for TV receivers or radio receivers and other apparatus. The apparatus forming the subject matter of the present invention is adapted to be readily adapted so that switches or switch type tuners are not simply stepped along from one position to another, but are stepped along from one live position to a succeeding live position.

For convenience, the invention will be discussed in connection with a switch type TV tuner although it will be understood that other devices may be readily controlled instead of a tuner. At present there are in active use some 12 channels in the V. H. F. television band. These channels are numbered from 2 to 13, inclusive, the 1st position as a rule not being used. In most metropolitan areas there may be as many as five or six channels which are in active use, the remainder not being assigned. It is thus desirable to be able to switch a television set from one live channel, such as for example 2, to the next live channel, which may for example be 5. From 5 the next succeeding live channel may be 7.

Inasmuch as the identity of the live channels will depend upon the area where a receiver is used and even then may vary over a period of years as new stations come in and old ones go out, it is desirable to provide means for readily adjusting the position of a live channel on the selecting apparatus.

This invention provides two different modifications wherein the selection of which channels are live may be effected at the receiver or at a remote station. In both forms of the invention, of those channels or positions which are selected as live, a user may choose anyone of such live channels as the channel to be tuned in by the receiver.

For a thorough understanding of the invention reference will now be made to the drawings wherein exemplary embodiments are illustrated, it being understood that variations may be made without departing from the invention except as defined by the appended claims.

The system embodying the present invention includes as a portion thereof a device such as for example a switch type TV tuner which is to be indexed over a number of predetermined positions. Such switch type tuners are well known and may consist of a number of sections carrying suitable circuit components. Instead of a switch type tuner it is also possible to utilize a turret type of tuner. In both types of tuners, a rotary portion is adapted to have 13 positions corresponding to the 13 channels in a TV band.

As an example, the switch sections from which the entire system embodying the present invention may be made, may utilize the construction, generally disclosed in United States Patent 2,186,950, issued on January 16, 1940, to Allison. The actual physical movement of the rotary portion of the entire system may be accomplished by suitable mechanism. Thus as one example, a rotary solenoid such as disclosed and claimed in United States patent to Leland No. 2,501,950, issued on March 28, 1950, may be used. Such a solenoid may be designed for movement over a predetermined angular range. In the case where 13 positions are to be provided over a 360° range, the solenoid may be designed to advance its load by about 28°.

Since the present invention does not pertain to the detailed construction of the actuating means, no attempt will be made to describe in detail a rotary solenoid. Instead, the apparatus disclosed in the above identified patent may be considered as an example of one form of rotary solenoid which may be useful with the new remote control system.

As far as the switch type tuner is concerned, any one of a number of different constructions may be used—one example of which is illustrated in United States Patent 2,584,175, issued on February 5, 1952 to Wingert. Other switch or television type tuners may be used.

Figures 1, 2:
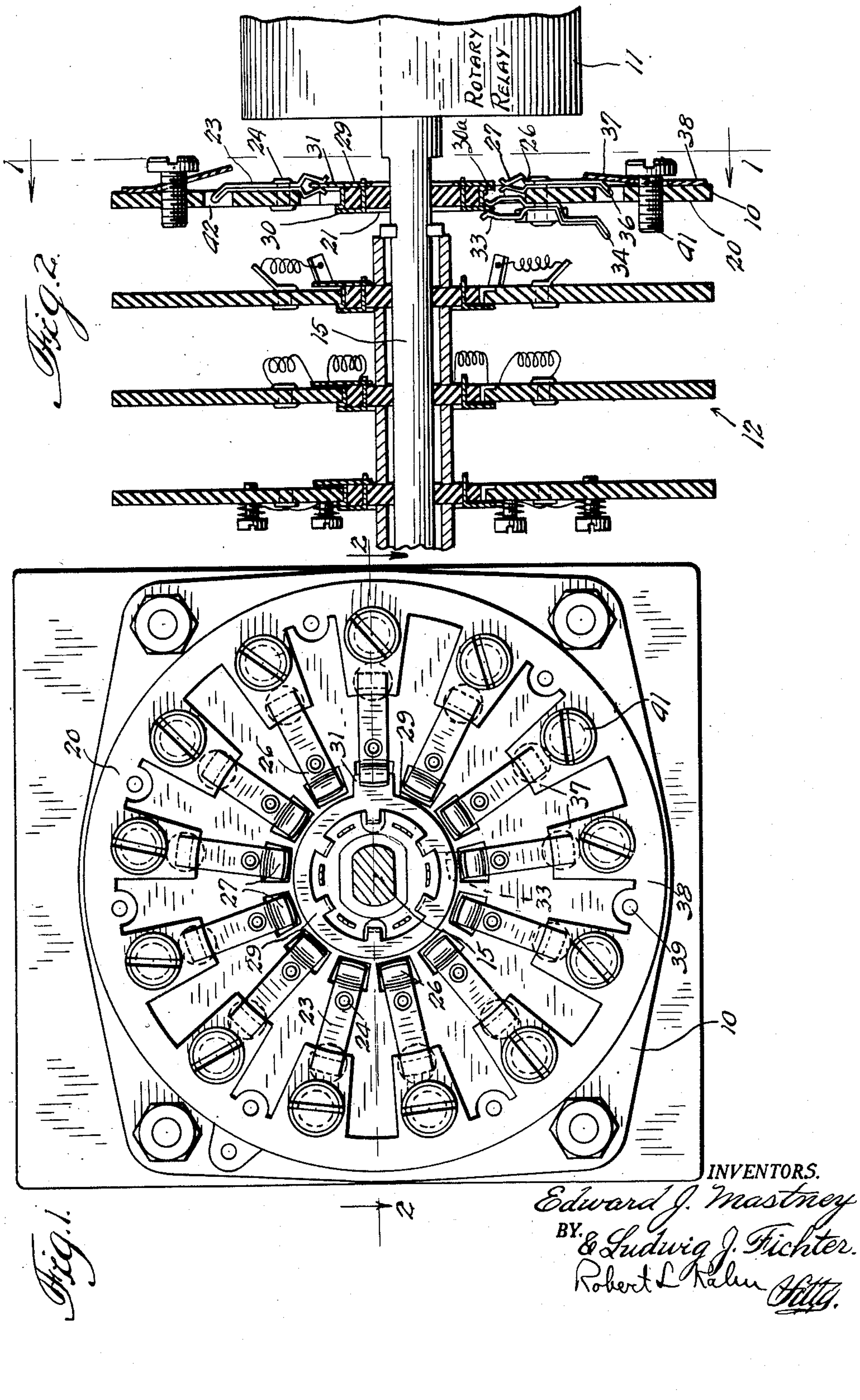
Figure 1 is a front view of one side of the control section of a remote control system embodying the present invention, partly in section on line 1—1 of Fig. 2.
Figure 2 is a sectional elevation on line 2—2 of Figure 1, Figure 2 also showing three sections of a switch type of TV tuner with which the invention may be used.
Figure 3:
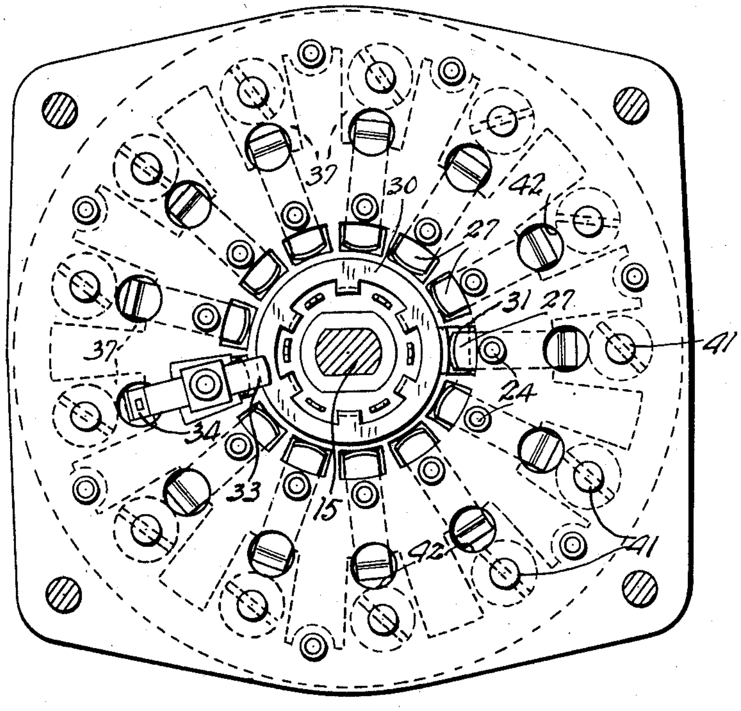
Figure 3 shows a reverse face of the control section of the remote control unit.

Referring now to Figures 1 and 2 in particular, the system embodying the present invention comprises control section 10, rotary solenoid 11 and a switch type tuner which may be generally indicated by 12. Control section 10 and switch type tuner 12 are mounted upon common shaft 15, this shaft being operated by the rotary solenoid. If the rotary solenoid is of the type disclosed in the above identified Leland patent, then an overrunning drive must be provided between the solenoid and the rotary portion of control section 10 and switch tuner 12. An example of a rotary solenoid and one way drive which may be used is disclosed and claimed in the copending application of James A. Dolesh and Edward J. Mastney, S. N. 359,502 filed June 4, 1953 now United States Patent No. 2,820,370, issued January 21, 1958. Thus the rotary armature of the rotary solenoid 11 may be permitted to return to its normal starting position without operating on the load.

Referring particularly to control section 10, this includes insulating stator 20 having an interior region cut out within which is secured rotor 21. Stator 20 may consist of a flat sheet of insulating material such as "Bakelite" or the like and has a series of electrical contacts 23 secured by rivets or eyelets 24. Contacts 23 are arranged in a circular pattern around the interior cut out region where the rotor is located. Since all contacts 23 are similar in construction, the sectional showing in Figure 2 will suffice for all the contacts. Each contact 23 corresponds to an index position for a possible TV channel. Therefore, in the case of a remote control TV tuner for operating on the various channels, there may be 13 contacts arranged uniformly as illustrated in Figure 1. Each contact 23 has inner end 26 provided with one or more spring jaws 27. All contacts 23 are identical in shape and in length.

Spring jaws 27 of the stationary contacts cooperate with annular contact 29 disposed upon the side of insulating rotor 21. The general construction of the stator and rotor follows along the lines of the Allison patent previously identified and except where otherwise noted, it will be assumed that mechanical features not specifically described here are the same as in the Allison patent. Rotor disc 21 is rotatively disposed within a circular cutout of stator 20, rotor disc 21 having two continuous annular contacts 29 and 30 on opposite faces thereof. These two annular contacts are electrically connected as by lugs 30*a*.

Referring first to annular contact 29, this has one extension 31 whose angular extent is such that it may be engaged by the jaws of one contact 23 at a time. Annular contact 29 is otherwise continuous throughout 360° and, except for tongue or extension 31, the remainder of annular contact 29 is clear of jaws 27 of stator contacts 23.

Figure 4:
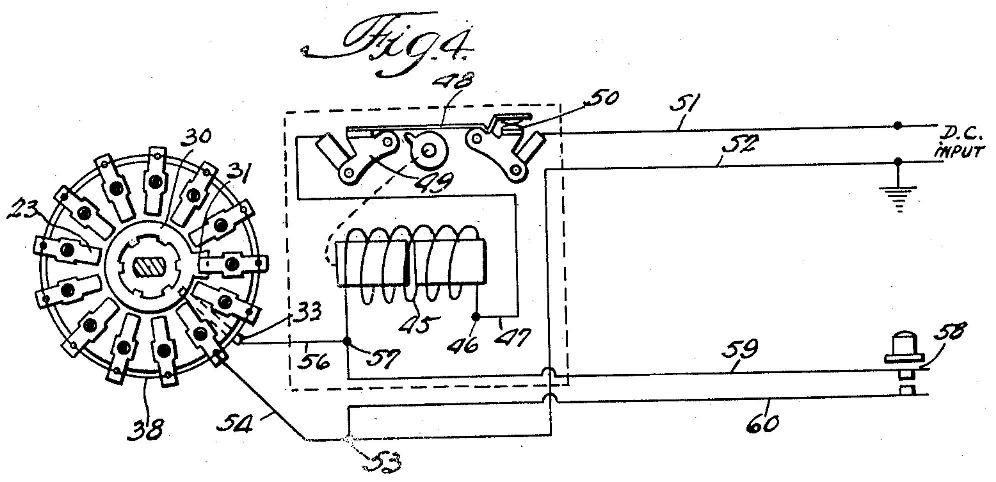
Figure 4 is a diagrammatic showing of one form of a system embodying the present invention.
Figures 5, 6:
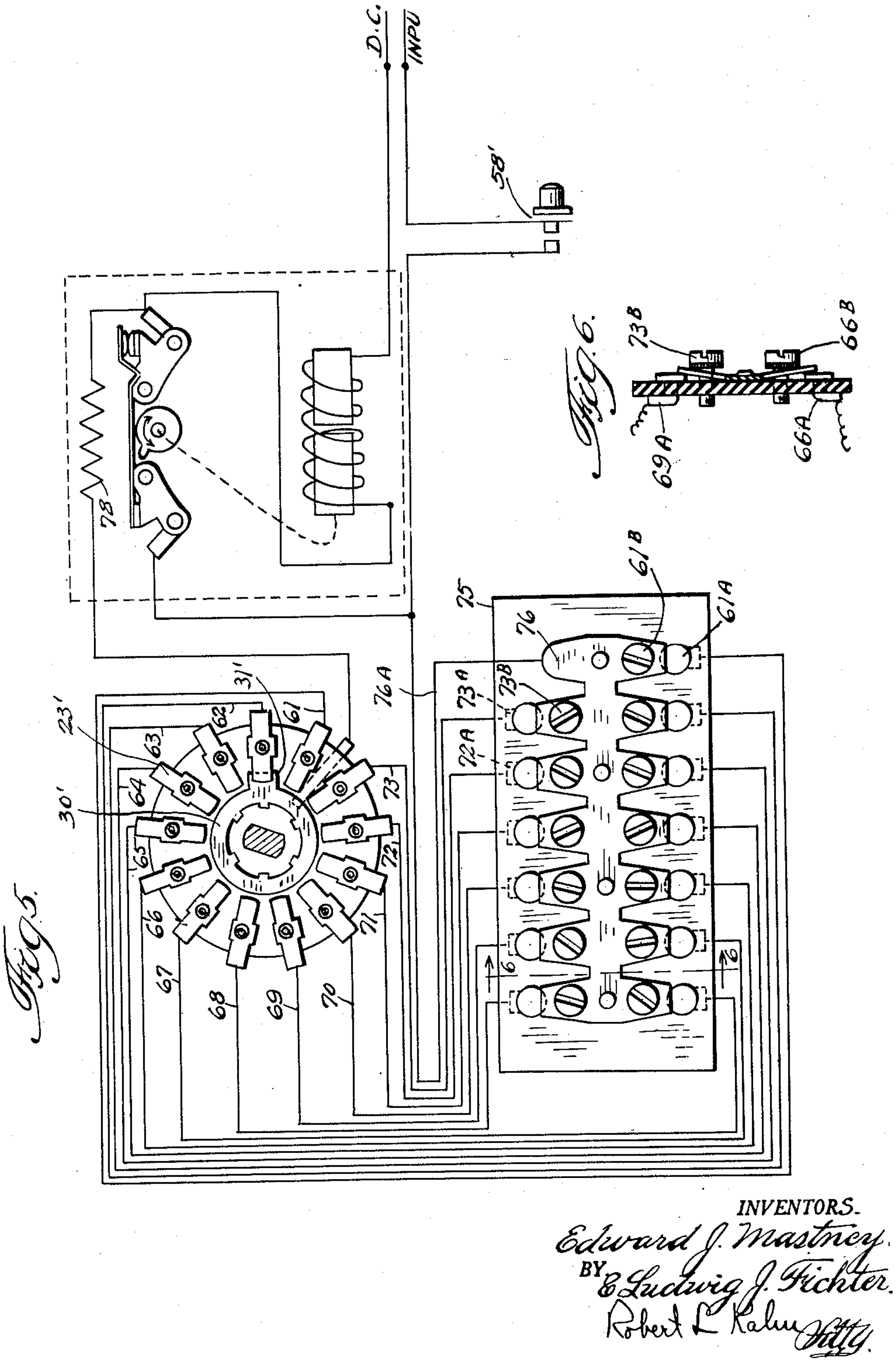
Figure 5 shows the modified system embodying the present invention.
Figure 6 is a detail on line 6—6 of Figure 5.

Annular contact 30 on rotor disc 31 has no extensions outwardly therefrom and functions as a grounding contact to be engaged at all times by stator grounding contact 33. Stator contact 33 is carried by stator 20 on the side opposite to contacts 23 and is electrically insulated therefrom. Stator contact 33 may be secured at some position intermediate adjacent contacts 23 or may be secured by one of the eyelets 24 used for one of the contacts 23. In the latter case, it is necessary that the eyelet or rivet be electrically insulated from one of the two stator contacts. It is easiest to insulate the stator contact 33 from the rivet or eyelet, thus leaving contacts 23 of the same type. While various means may be utilized for insulatingly mounting contact 33 opposite to one of the stator contacts 23, a convenient construction is illustrated in United States Patent 2,128,279, issued on August 30, 1938. It will be noted that stator contact 33 is also provided with spring jaws which engage the opposite sides of rotor contact 30. It is also possible to mount contact 33 in a position between adjacent contacts 23, as illustrated in Figures 4 and 5.

Instead of having spring jaws engaging the opposite sides of the rotor contacts, it is possible to have other shapes of spring contacts for maintaining a desired contact action. Stator contact 33 has conventional terminal lug 34 for connection to a circuit to be described later. Stator contacts 23 differ from the stator contacts in the Allison Patent 2,186,950 in having outer portions 36 adapted to function as switch contacts. Cooperating with each outer portion 36 of stator contacts 23 is spring portion 37. The various spring contact portions 37 are all connected to annular metal support member 38 rigidly attached to insulating stator 20. The attachment may be by rivets 39 or other suitable means. Each spring contact 37 is spring biased away from cooperating contact portion 36 as illustrated at the top of Figure 2. However, screw 41 threaded into a suitable aperture in stator 20 may be turned down to force spring contact 37 to close against contact portion 36. It may be desirable to provide slots 42 in insulating member 20 so that contact portion 36 may extend into a hole for proper contact action and contact alignment.

It is clear that unless a screw 41 is turned to force a contact tongue 37 against cooperating contact 36, that a stationary contact 23 will not be connected to anything unless tongue 31 of the rotor happens to engage that particular stationary contact.

To select a live channel, it is only necessary to have screw 41 in the position as shown in the top of Figure 2 where spring contact 37 is clear of its cooperating contact 23.

Referring now to Figure 4, a complete system embodying the present invention will be explained. Rotary solenoid 11 has operating winding 45, one of whose terminals 46 is connected by wire 47 to movable contact 48 of switch 49 forming part of the solenoid structure. As disclosed in said Leland patent, when winding 45 is energized, an armature is caused to rotate to a desired angle against the bias of a spring.

Switch 49 is operated as by a cam, by an armature to open the circuit for winding 45 when the armature has moved through its predetermined range of travel after which the armature may be returned to its starting position by the spring bias. Movable contact 48 cooperates with fixed contact 50 which is connected to wire 51 going to one terminal of a suitable source of direct current. The other terminal of the source of direct current may be grounded and is connected by wire 52 to junction 53. From junction 53 wire 54 goes to annular ring 38 so that in effect junction 53 is connected to every contact 37.

Rotor contacts 29 and 30 are electrically connected to each other. Contact 33 is connected by wire 56 to terminal 57 of relay winding 45. Contact 33 is here shown as being between adjacent contacts 37 and may be secured by a separate eyelet. In the form of the invention illustrated here, manual switch 58 is connected by wires 59 and 60 to junctions 57 and 53, respectively. Switch 58 is normally open but may be closed for operating the device.

If switch 58 is closed, a circuit will be completed through winding 45 of solenoid 11. Solenoid 11 will move the rotor of control section 10 through at least one index position. If switch 58 is now opened, the following may occur. If tongue 31 of the rotor happens to engage a dead contact 23 (one where screw 41 is clear as in the top of Figure 2), then the mechanism will stop at this index position and this will be the next live channel. However, if the particular contact 23 is alive, as would be the case if screw 41 were down, then control section 10 will complete a circuit for energizing solenoid 11 for one more step. The rotary solenoid will therefore be stepped along by control section 10 until a dead contact 23 is encountered whereupon it will stop. It is clear that any desired live channel may be selected by simply loosening screw 41 to permit spring contact 37 to clear a particular stationary contact.

It is desirable to have switch 58 closed momentarily only even though the button is held down, so that only one step of the solenoid will occur in response to the closure of switch 58. Thus, if two or three successive index positions are to correspond to live channels, then a fast acting solenoid will not make it difficult to select any desired channel.

In the form of the invention illustrated in Figure 4, switch 58 may be disposed at any remote station and requires only two wires 59 and 60 to connect the same to the system. In order to change the position of any live channel, it is necessary to get inside of the mechanism for operating on screws 41. This may be undesirable and accordingly the modification in Figure 5 is provided for permitting adjustment at a place outside of the tuner.

Referring now to Figure 5, this is generally similar to the system illustrated in Figure 4 with the exception that annular ring 38 has been omitted together with tongues 37. Instead, each contact member 23' is connected by wires 61 to 73, inclusive, to corresponding contact members 61A to 73A, inclusive. Contact 61A to 73A, inclusive, are mounted on an insulating board 75 carrying grounding contact member 76. Grounding member 76 carries screws 61B to 73B, inclusive, which are adapted to provide a selective connection between the corresponding contact and grounding contact 76. Thus, as each screw 61B to 73B is turned down, electrical contact is established between the particular contact 61A to 73A and ground contact 76.

In effect, the annular grounding strip 38 from Figure 2 and the selective connection by screws 41 is transferred to the contacts on support 75. Insulating member 75 and its contacts may be disposed conveniently upon any desired portion of a TV receiver which is readily accessible and requires a comparatively short length of cable for connection to control section 10. The armature of the system including the manual control switch may be the same as in Figure 4 or may be as illustrated with the control switch 58' being in series directly with the source of power for operating the solenoid. Thus a remote control will require only two wires for connection while providing a readily accessible convenient location on the receiver for making the adjustments for channel selection.

In the modified system illustrated in Figure 5, ballast 78 is provided to prevent overheating of the solenoid winding in case switch 58' is kept closed for any length of time.

The switching apparatus apart from the system as a whole may be used independently of the solenoid or a switch type TV tuner. It is possible to have the various contact members disposed along a straight line.

In the form of the invention illustrated in Figures 1 to 4 inclusive, metal members 23 have active contact portions at two regions, the two ends of the member in the specific form illustrated. Thus each member 23 may be considered as a metallic means having permanently connected contact portions at the ends thereof. The contact members 23 as specifically illustrated provide inner and outer series of contacts. The outer series of contacts cooperate with a third series of contacts indicated by 37 to form a cooperating pair of switch contacts. Such a pair of switch contacts may be closed against each other or opened. It is clear that the spring and screw means illustrated may be disposed on contact members 23. Other readily adjustable means may be used.

In the modification illustrated in Figure 5, a metal member 23' together with its connecting wire going to a lug on insulating board 75 may be considered as providing a metallic means having permanently connected contact portions. One series of such portions provide one series of contacts cooperating with the movable contact and the other series of such portions provide another series of contacts cooperating with the spring contacts on insulating base 75.

In all instances, stationary contact 33 functions as a grounding contact for the movable contact. It is possible to have stationary grounding contact 33 cooperate with annular contact 29, thus eliminating the necessity for annular contact 30. It is also possible to eliminate annular contact 29 and mount movable contact portion 31 as a separate piece on the insulating rotor and connect the same to annular contact 30.

What is claimed is:

1. A switch construction comprising an insulating base, a plurality of stationary contacts rigidly supported on said base and arranged in a circular pattern, each stationary contact extending radially with the inner end as an active contact portion, a rotor supported on said insulating base, a movable contact carried by said rotor, said movable contact having an active contact portion for cooperating with one stator contact at a time, means for grounding said rotor contact, a solid metal support member, said solid metal support member having a plurality of movable spring contact fingers, there being a spring contact finger for each stator contact, a fixed metal contact portion adjacent each spring contact finger, said fixed contact portion being electrically connected to a stator contact, screw means for effecting engagement or disengagement between a spring contact finger and its corresponding fixed contact portion, each spring contact finger being thereby electrically connectable selectively to its corresponding stator contact, said metal support member having a common connection, said entire construction being adaptable to have the rotor stepped along by solenoid means, the rotor contact stepping from one stator contact to the next stator contact, the control circuit for said solenoid means being adapted to include said grounded rotary contact and the common connection for said support member and the stopping position of said switch means being readily adjustable by said individual screw means.

2. The construction according to claim 1 wherein said metal support member and said fixed metal contact portions adjacent each spring contact finger are mounted on a separate insulating base and wherein a cable is provided for connecting the corresponding stator contacts and fixed metal contact portions so that said metal support member may be disposed at an accessible location while the rotary switch may be coupled to a load whose position is to be controlled.

3. The construction according to claim 2 wherein said solid metal support member is an elongated straight strip of metal having spring contact fingers extending laterally therefrom.

4. The construction according to claim 1 wherein said metal support member comprises an annular member with the spring fingers extending inwardly therefrom and wherein the fixed metal contact portion adjacent spring finger is the outer end portion of the stator contact.

References Cited in the file of this patent

UNITED STATES PATENTS

| | | |
|---|---|---|
| 2,132,277 | Stewart | Oct. 4, 1938 |
| 2,433,389 | Newton | Dec. 30, 1947 |
| 2,558,888 | Trimble | July 3, 1951 |
| 2,577,225 | Barry | Dec. 4, 1951 |
| 2,594,190 | Mastney | Apr. 22, 1952 |

FOREIGN PATENTS

| | | |
|---|---|---|
| 643,366 | Great Britain | Sept. 20, 1950 |